US009410706B2

(12) United States Patent
Ferlay

(10) Patent No.: US 9,410,706 B2
(45) Date of Patent: Aug. 9, 2016

(54) MODULAR HEATING STRUCTURE THAT CAN BE FITTED TO THE INTERIOR WALLS OF BUILDINGS

(75) Inventor: Charles Ferlay, Montrottier (FR)

(73) Assignee: GERFLOR, Villeurbanne (FR)

( * ) Notice: Subject to any disclaimer, the term of this patent is extended or adjusted under 35 U.S.C. 154(b) by 522 days.

(21) Appl. No.: 14/000,303

(22) PCT Filed: Feb. 7, 2012

(86) PCT No.: PCT/FR2012/050258
§ 371 (c)(1),
(2), (4) Date: Dec. 2, 2013

(87) PCT Pub. No.: WO2012/120210
PCT Pub. Date: Sep. 13, 2012

(65) Prior Publication Data
US 2014/0076514 A1   Mar. 20, 2014

(30) Foreign Application Priority Data

Mar. 4, 2011   (FR) ...................................... 11 51752

(51) Int. Cl.
*F24D 3/16*   (2006.01)
*F24D 19/06*   (2006.01)
(Continued)

(52) U.S. Cl.
CPC ................ *F24D 3/142* (2013.01); *F24D 3/145* (2013.01); *F24D 3/16* (2013.01); *F24D 19/06* (2013.01); *E04F 13/0862* (2013.01)

(58) Field of Classification Search
CPC ........... F24D 3/16; F24D 3/148; F24D 3/142; F24D 19/06; F24D 19/062; F24D 19/067; F24D 19/0009; F24D 19/0097; F24D 19/0209; F24D 19/023; F24D 19/0263; F24D 5/10; F24D 1/00; E04F 13/0862; E04F 13/074; Y02B 30/22; Y02B 30/24
USPC ...................... 237/70, 56, 71, 73, 74, 79, 49; 52/302.1, 220.8, 198, 396.01, 396.09; 165/47, 48.1, 48.2, 49, 50, 53, 54, 55; 432/249, 251, 238

IPC ......... F24D 3/16,3/14, 19/06, 19/02, 5/10; F24J 2/04; E04F 13/0862
See application file for complete search history.

(56) References Cited

U.S. PATENT DOCUMENTS 1,798,892 A * 3/1931 Murray, Jr. .......... F24D 19/0002
126/90 R
1,845,243 A * 2/1932 Cox .................... F24D 19/1006
126/110 A (Continued)

FOREIGN PATENT DOCUMENTS

DE   25 34 140 A1   2/1977
DE   296 22 794 U1   7/1997

(Continued)

OTHER PUBLICATIONS

International Search Report for International Application No. PCT/FR2012/050258, dated May 30, 2012.

*Primary Examiner* — Gregory Huson
*Assistant Examiner* — Daniel E Namay
(74) *Attorney, Agent, or Firm* — Heslin Rothenberg Farley & Mesiti P.C.

(57) ABSTRACT

Installation to obtain a radiative heating wall includes a panel form heating modular structure of ceiling height, arranged vertically with the rear face resting against a wall. Each structure includes a plurality of spaced-apart and parallel vertical members fixed to a back wall. Each member overlies a heat exchanger arranged horizontally with fluid circulation ducts, and has quick connect fittings for several protective and decorative panels. Each vertical member includes an upper member and a lower member aligned with one another and sandwiching the heat exchanger. Each modular structure has bottom and top ventilation gratings, and air conducting passages defined by strips situated between each pair of consecutive vertical members, the panels and the back wall.

10 Claims, 4 Drawing Sheets

Figure 1:
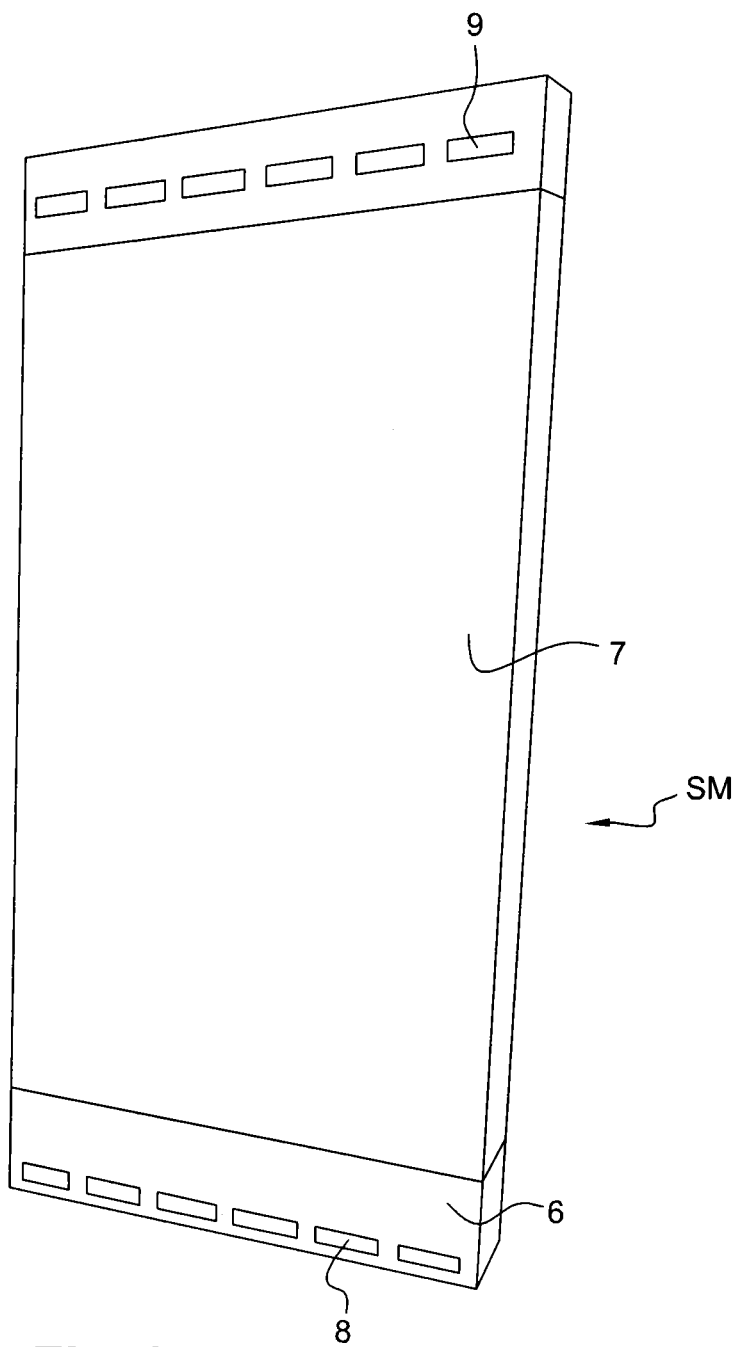

(51) Int. Cl.
  *F24D 3/14* (2006.01)
  *F24D 5/10* (2006.01)
  *F24J 2/04* (2006.01)
  *E04F 13/08* (2006.01)

(56) References Cited

U.S. PATENT DOCUMENTS

| | | | | |
|---|---|---|---|---|
| 1,859,056 | A | * | 5/1932 | Seelert .................... F24D 3/147 165/129 |
| 1,878,012 | A | * | 9/1932 | Ashley ...................... F24F 1/01 165/100 |
| 4,098,327 | A | * | 7/1978 | Reato .................... F28D 1/0246 165/104.19 |
| 4,203,487 | A | * | 5/1980 | Gartner .................. F24D 3/145 165/183 |
| 4,290,415 | A | * | 9/1981 | Tatsumi .................... F24D 5/02 126/628 |
| 4,497,362 | A | * | 2/1985 | Teague, Jr. ............ F24F 12/001 165/54 |
| 5,802,249 | A | * | 9/1998 | Kurz .................... A61H 33/063 392/347 |
| 7,100,682 | B2 | * | 9/2006 | Okamoto ................ H05K 7/206 165/104.33 |
| 7,255,152 | B2 | * | 8/2007 | Friedlich .................. F28F 1/32 165/182 |
| 2006/0174864 | A1 | * | 8/2006 | Pordzik ............... F24D 19/0087 126/110 E |
| 2009/0114381 | A1 | * | 5/2009 | Stroobants .......... F24D 19/0082 165/201 |
| 2010/0018978 | A1 | * | 1/2010 | Osborne ............... B65D 90/046 220/495.01 |
| 2010/0237056 | A1 | * | 9/2010 | Goldsmith ........... F24D 19/062 219/213 |
| 2011/0083384 | A1 | * | 4/2011 | Russell-Smith .......... F24D 3/12 52/302.1 |
| 2014/0144091 | A1 | * | 5/2014 | Neil ........................ E04B 1/161 52/220.1 |

FOREIGN PATENT DOCUMENTS

| | | | |
|---|---|---|---|
| FR | 2 712 074 A1 | 5/1995 | |
| FR | 2 932 252 A1 | 12/2009 | |
| IT | EP 0386392 A1 * | 9/1990 | ............. F24D 19/06 |
| JP | 02130329 A * | 5/1990 | |
| JP | 02287033 A * | 11/1990 | |
| JP | 2010243127 A * | 10/2010 | |

* cited by examiner

MODULAR HEATING STRUCTURE THAT CAN BE FITTED TO THE INTERIOR WALLS OF BUILDINGS

CROSS REFERENCE TO RELATED APPLICATIONS

This application is a national stage filing under section 371 of International Application No. PCT/FR2012/050258, filed on Feb. 7, 2012, and published in French on Sep. 13, 2012, as WO 2012/120210 and claims priority of French application No. FR 1151752 filed on Mar. 4, 2011, the entire disclosure of these applications being hereby incorporated herein by reference.

BACKGROUND ART

The invention relates to the heating of multiple-use dwelling premises, be they private or for business purposes, offices, or other surfaces to be heated.

As known, the heating of buildings is performed by convection, which requires often bulky and apparent equipment, requiring to be applied on the ground or the walls, which does not always look good.

In the renovation of buildings and/or premises, one has to choose between modifying the entire existing installation with high costs, or keeping it.

It is also known to form installations with an under-floor heating, which has the reputation of having certain disadvantages for the inhabitants. It may create some discomfort for people living on the premises, who may have "heavy" legs for blood circulation reasons. This discomfort is caused by the under-floor heating propagation.

Heating by radiation of the different walls of a room, which provides improved comfort and temperature conditions due to a larger exchange surface, is also known. Existing wall coverings use a hot water circulation within the wall, thus strongly limiting the functionalities thereof.

A technical solution has been described in French patent 2 932 252 for which the Applicant of the present application is a co-applicant.

This document also indicates that the installation of such a wall-type covering is completed by the use of a baseboard arranged at the junction between the room floor and said wall covering. The baseboard has perforations connected to the second layer of said covering to allow natural convection heating mode. One or several perforated bands let the hot air out.

This solution described in the above-mentioned patent is currently being experimented, which experimentation opens up very interesting new perspectives.

However, the use of such a solution may have its limits for the following reasons. It is first necessary for a maintenance monitoring of the radiative heating part to be possible, which would not be possible with a wall covering installed all along the height of the walls of premises. Further, in known fashion, heating conditions often result in a deterioration, a fouling, or dirtying of the walls by the sole natural convection of air, without mentioning degradation due to the actual environment. The cleaning of wall covering remains difficult and renewing such wall coverings too often should hardly be envisaged, because of the high cost thereof.

An installation providing a radiative heating wall such as defined in the preamble of claim 1 is also known from document FR 2 712 074.

An installation defined in patent DE 2 534 140 is also known.

However, the solutions described in these two documents are not satisfactory.

The Applicant has thus chosen the approach of searching for a solution while keeping to the principle of a radiative wall heating, which remains the best compromise for the occupant's comfort.

The Applicant has also taken into account in his approach the constraints of such a capacity of constantly monitoring the heating means, their maintenance, and their location.

The Applicant's approach has also been to limit, in the context of the renovation of buildings and premise, modifications of existing heating circuits and the generated costs.

The Applicant's approach has also been to take into account an improved ability to change the apparent surface of the wall lining, in particular in building renovation.

The provided solution perfectly fulfills all these objects, while managing several constraints, sometimes antagonistic, to obtain a correct operation of the heating wall or wall lining.

BRIEF SUMMARY OF INVENTION

According to a first feature of the invention, the installation enabling to obtain a radiative heating wall which comprises at least one panel-shaped modular heating structure having its height corresponding to the height of the premises to be heated from the floor to the ceiling, the panel-shaped modular structure being arranged vertically with its rear surface resting against a wall, each panel-shaped modular structure being formed of a plurality of spaced-apart vertical posts arranged on a back plate, where each vertical post comprises a post under which is horizontally arranged a heat exchanger with fluid circulation ducts, and where the vertical posts are fitted with means allowing a protective and decorative panel to be quickly fitted thereto, is remarkable in that the vertical posts are fixed to the back wall and in that each vertical post comprises an upper post and a lower post aligned with each other and the heat exchanger is horizontally arranged between them, and in that it comprises several protective and decorative panels, and in that the means for fitting the upper and lower posts also allow a fast disassembly, and in that each modular structure comprises in its lower portion and in its upper portion ventilation gratings, and in that the air conducting passages are defined by the strips located between each pair of consecutive vertical posts, the protective and decorative panels, and the back wall.

The foregoing and other features will appear from the following description.

BRIEF DESCRIPTION OF THE DRAWING FIGURES

Figures 2, 3:
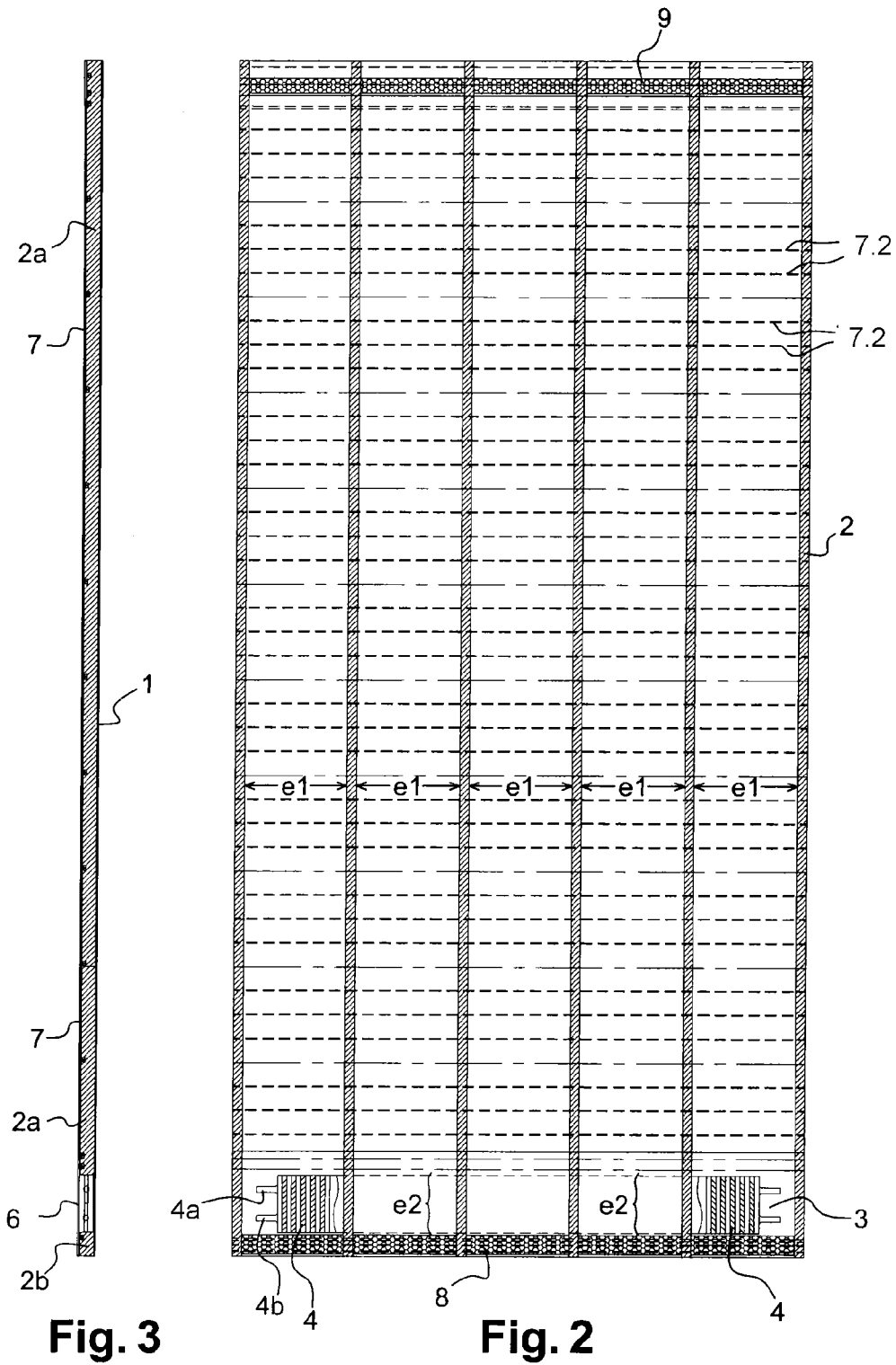
Figure 4:
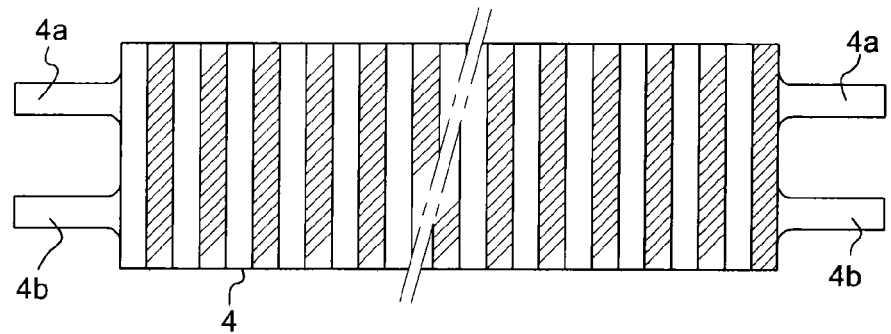
Figure 5:
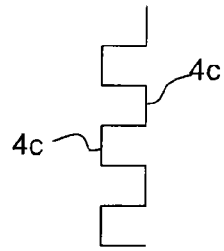
Figure 6:
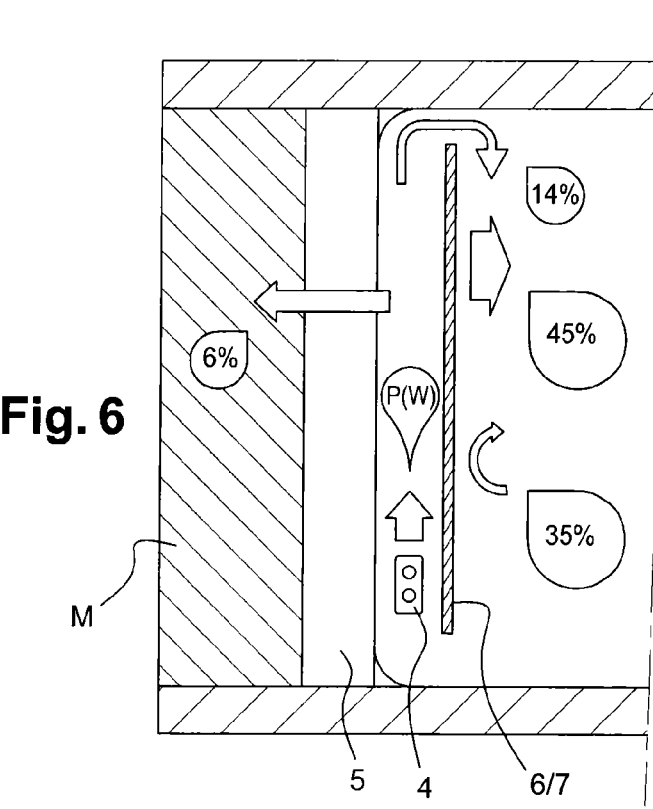
Figure 7:
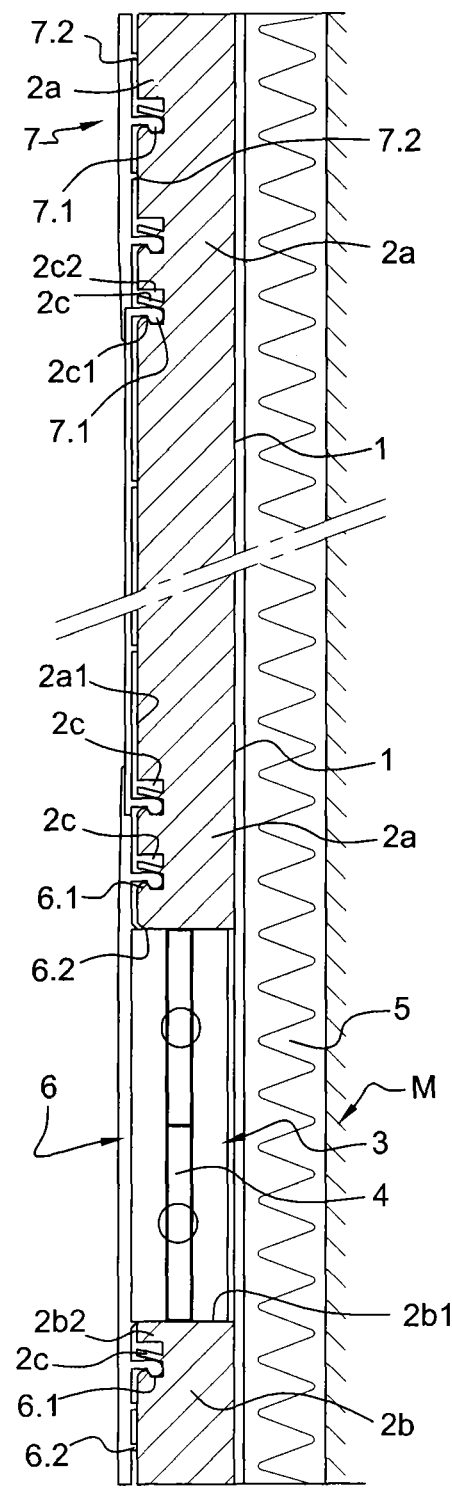

The object of the invention is illustrated as a non-limiting example in the drawings, where:

FIG. 1 is a simplified view of a modular structure in the form of a panel according to the invention, in external view, FIG. 2 is a front view of a panel according to the invention after removal of the protective and decorative panels, FIG. 3 is a side view of the panel of FIG. 2, FIG. 4 is a simplified view of the heat exchanger installed in the modular structure, FIG. 5 is a partial side view illustrating the profile of the heat exchanger, FIG. 6 is a simplified view illustrating the heat exchange efficiencies according to the areas of the modular structure, FIG. 7 is a cross-section view showing the adjustment of the protection and decorative panels on the vertical posts of the modular structure.

DETAILED DESCRIPTION

To make the object of the invention more tangible, it is now described in a non-limiting way illustrated in the drawings.

The invention aims at a panel-shaped modular structure generally referred to as (SM) capable of resting against and of being fixed to walls of premises to be heated. In the following description, term 'local' will be used to identify any construction for any purpose intended to include the modular structure(s) enabling to create a radiative heating wall. Thus, the modular structure forms a module by itself and the number of modules assembled side by side is thus variable according to the dimensional characteristics of the wall to be covered and also according to the desired thermal effects, and also according to the desired aspect of the fitting of the considered premises. A modular structure will be described hereafter, it being considered that several modular structures may be arranged in contact alignment with any appropriate jointing means.

The modular structure (SM) is intended to directly rest against a wall (M) or against a thickness of intermediate inner insulator (5) known per se, glass wool, wood wool, polystyrene, or others. Such a modular structure is anchored to the wall by crossing the insulation layer, if present, by any appropriate means. In a specific embodiment, the modular structure (SM) may directly integrate the interior insulator (5) so that the assembly is directly anchored to the wall. In this case, the insulating material is arranged between the back plate (1) of the modular structure and another intermediate wall against which the vertical posts (2) are fixed.

The modular structure (SM) is preferably arranged along, or substantially along, the height of the wall (M) to be covered, that is, along, or substantially along, a height from the floor to the ceiling. The vertically-arranged modular structure (SM) comprises a back plate (1) against which are vertically arranged a plurality of regularly spaced apart vertical parallel posts (2) defining between them, as an interval, a space (e1) having a function which will specified hereafter. Each post (2) comprises, aligned therewith, an upper post (2a) of large height and a lower post (2b) of small height defining between them, by the plurality of posts, a continuous horizontal band (3) used to house the heat exchanger (4). More specifically, the lower posts (2b) are arranged along a small height and rest against the floor. They are fixed by gluing, screwing to the back wall (1), or by any other means. They have a width of a few centimeters. The upper post (2a) is thus arranged along a large height substantially from the upper portion of the exchanger all the way or substantially all the way to the ceiling of the premises. The upper posts (2a) are also fixed by gluing, screwing, or other on the back plate (1). Between the posts (2a), (2b), a volumetric space (e2) is defined across the entire horizontal width of the modular structure by defining the band (3) authorizing the positioning of the heat exchanger specific to each modular structure. The exchanger (4) rests on the horizontal upper surface (2b1) of the lower vertical posts and is arranged across the entire width of the corresponding module. Fixing means, not shown, are used to fix the exchanger to the back plate (1) and to ensure the holding thereof.

According to an important provision, the height of the lower posts (2b) and of the exchanger (4) substantially corresponds to a conventional baseboard height in dwelling premises.

Further, said vertical posts (2a) (2b) are fitted on their external apparent surface (2a1) (2b2) with female configuration means (2c) to allow the nesting and the fast removable fitting of protective and decorative panels (6) and (7), themselves fitted with complementary male anchoring means (6.1) (7.1). More specifically, as illustrated in the drawings, the vertical posts (2a)(2b) are identically fitted with means (2c) forming housings in the form of profiled grooves respectively provided with a hook-shaped portion and with a tab-shaped portion (2c1)(2c2) for receiving the complementary male fastening means (6.1)(7.1) formed on the protective and decorative panels. The description and the illustration of the anchoring means are non limiting. The tabs (2c2), which have some flexibility, have the function of absorbing material deformations of the anchoring elements (6.1) (7.1). Thus, the lower post (2b) is fitted with a female configuration means (2c) of the type described for the lower fastening of the lower protective panel (6). The upper post (2a) is fitted in its lower portion with two successive housings (2c), one for fixing the protective panel (6) in its upper portion, and the second one for fixing the protective panel (7) in its lower portion. The upper post (2a) has in its upper portion a housing (2c) of the previously-mentioned type for fixing the upper protective panel (7). The upper vertical posts (2a) and the upper protective panel (7) may be arranged at mid-height, for example, with complementary anchoring means (2c) (7.1) to complete the fastening and the hold. It may be devised, without departing from the spirit and scope of the invention, for the upper protective panel (7) to be formed in one or several portions by then providing to fit the vertical posts (2a) with a number of housings (2c) capable of receiving them. The protective panels (6) and (7), are made of any conductive material having a determined heat conductivity and are snappable on the receiver posts, (2a) (2b). These panels should however ensure the desired thermal radiation function and the materials are adapted to provide this functionality. The panels are easily removable and the appearance of the walls linings thus formed can be modified at will.

According to another provision of the invention, the heat exchanger (4) crosses almost the entire width of each module of the modular structure. The exchanger (4) conventionally comprises fluid circulation duct inlets and outlets (4a) (4b) arranged to receive quick-disconnect plumbing-type connection members. Thus, as illustrated in FIG. 2, the exchangers do not emerge outside of the modular structure. The fluid inlet and outlet ducts, (4a) (4b), are slightly backwards in band 3, enabling to introduce and to fix the connection and branching members, thus enabling to protect them. At the circuit end, the exchanger comprises a loop connection of known type. The heat exchanger being arranged in most of the width of the modular structure, the heating that it provides will allow air to flow by rising in the ducts or air strips formed between the vertical posts (2a), the back plate (1), and the protective and decorative panels (6) and (7), according to the spaces (e1) thus defined. One or several lower ventilation and ambient air inlet gratings (8) are provided at the bottom of the modular structure, and one or several ventilation and hot air outlet gratings (9) are provided in the upper portion of the modular structure. Further, the protective panels, (6) and (7), are themselves heated, and transmit the heat by radiation into the receiving premises.

Thus, according to the invention, the quantity of heat transmitted into the premises, on the one hand through the hot air outlet opening, but mostly by the quality of the thermal radiation provided by panels (6) and (7), is considerably increased. The latter are of course made of materials which are capable of easing and of transferring the heat conductivity, while being of great strength and offering specific decorative aspects.

The hold of the panels, (6) and (7), with respect to the posts is also improved and ensured by the forming on their internal surface of a plurality of horizontal stiffeners (6.2) (7.2) which rest against the opposite surfaces (2a1) (2b2) of said posts. This avoids any inappropriate warping of the panels.

In the context of the optimization of the thermal efficiency of the exchanger, said exchanger is designed in a fluted configuration (4c) on each of its surfaces to increase heating surface areas. The forming of the exchanger is within the abilities of those skilled in the art.

A number of thermal energy transfer measurements have thus been performed with a prototype.

As shown in the diagram of FIG. 6, the thermal power is transferred by radiation, by approximately 35% in the lower portion of the modular structure at the location of and close to the exchanger positioning area, by 45% in the upper portion, above the former, and beyond ventilation ports (9) which cause the coming out of 15% of the emitted thermal energy. The bearing wall, through the insulator (5), recovers approximately 6% of the emitted heat.

The sides of the lateral edges of each modular structure are of course closed as appropriate to ensure the desired heat conductivity function and to optimize the radiating surface area.

The advantages of the invention are clear. The novel concept of a modular radiative structure, which provides a very large heating and radiation surface area, should be underlined.

The removal of the protective panels, (6) and (7), also enables to provide a servicing, a cleaning, and a maintenance.

The multiplying of air strips between two consecutive vertical posts makes the heat transfer homogeneous.

The manufacturing is simple and inexpensive, and the installation of several modular structures according to the invention has advantageous applications in building renovation.

The modular heating structure according to the invention provides a fast adaptability to the local geometry of the building or of the rooms by using the possibility of snapping the external panels (7) and by adapting their shapes and dimensions. The multiplicity of fastening points heightwise enables to adapt the height of the panels and of the plates according to needs.

Another advantage especially relates to the renovation of buildings which have been previously fitted with radiators or convectors, since these can be replaced without modifying the heating circuits, and the modular heating structure can be adapted by being directly connected to existing circuits.

The modular heating structures may be arranged on one, several, or all the walls of premises, according to needs.

The heat is obtained by the radiation along the entire height of the modular heating structures, that is, along almost the entire height of the room, from floor to ceiling, thus contributing to give the occupants a heating of their entire body by the homogeneous radiation.

The modular structures and the connection of the exchangers with quick-assembly plumbing connections—of PEX type—enable to adapt the invention to all walls with easy-to-implement functions. The configuration of the protective panels, (6) and (7), and of their radiation with their stiffening and male snap parts provides a resistance of the surface to flexion, while keeping a very thin surface thickness providing the minimum thermal resistance and necessary to the operation and to the radiation of the wall. The stiffeners and the snap elements have an appropriate size, enabling to limit load losses in the air strips and not to disturb or to block air speeds in the formed modular structure playing the role of an inner wall.

The invention claimed is:

1. A radiative heating wall installation, comprising: at least one panel-shaped modular heating structure having a height corresponding to a height of premises to be heated from floor to ceiling, the panel-shaped modular structure being arranged vertically with a rear surface resting against a wall, each panel-shaped modular structure being formed of a plurality of spaced-apart vertical posts arranged on a back plate, wherein each vertical post comprises a post under which is horizontally arranged a heat exchanger with fluid circulation ducts, and wherein the vertical posts are fitted with means allowing several protective and decorative panels to be quickly fitted thereto, wherein the vertical posts are fixed to the back plate and each vertical post comprises an upper post and a lower post aligned with each other, wherein the heat exchanger is horizontally arranged between the lower and upper post, and further comprising several protective and decorative panels, and means for fitting the panels to the upper and lower posts for fast disassembly, and wherein each modular structure comprises in a lower portion and in an upper portion ventilation gratings, and wherein air conducting passages are defined by strips located between each pair of consecutive vertical posts, the protective and decorative panels, and the back plate.

2. The installation of claim 1, wherein aligned vertical posts define between them a volume space across an entire horizontal width of each modular structure by defining a band authorizing positioning of the heat exchanger.

3. The installation of claim 2, wherin each exchanger rests on an upper horizontal surface of the lower vertical posts while being fixed to the back plate, each exchanger comprising inlets and outlets of fluid circulation ducts arranged backwards of the end portions of each modular structure, and said exchanger receives quick-assembly branching connections on the inlets and outlets of fluid ducts.

4. The installation of claim 1, wherein vertical posts are fitted on an external apparent surface with means of female configuration to allow the nesting and the fast removable fixing of the protective and decorative panels which include complementary male anchoring means.

5. The installation of claim 2, wherein a protective panel substantially covers the lower vertical posts and the band for receiving the exchanger, said panel being fixed in a lower portion on the lower post and on a lower portion of the upper post.

6. The installation of claim 1, wherein a protective panel is fixed to a lower portion of the upper post and to an upper portion of the upper post.

7. The installation of claim 1, wherein the panels have a plurality of horizontal stiffeners bearing against opposite surfaces of the posts.

8. The installation of claim 1, wherein the panels are made of a thermally-conductive material.

9. The installation of claim 1, wherein the modular heating structures directly integrate an insulating material arranged between the back plate of each structure and an intermediate wall having the vertical posts fixed against the intermediate wall.

10. The installation of claim 9, wherein the insulating material is arranged between the back plate and an opposite wall lining.

* * * * *